US011465360B2

(12) United States Patent
Long et al.

(10) Patent No.: US 11,465,360 B2
(45) Date of Patent: *Oct. 11, 2022

(54) ADDITIVE MANUFACTURED RESISTIVITY

(71) Applicant: HEWLETT-PACKARD DEVELOPMENT COMPANY, L.P., Spring, TX (US)

(72) Inventors: Greg Scott Long, Corvallis, OR (US); Jake Wright, San Diego, CA (US); Phil D Matlock, Corvallis, OR (US); David L Erickson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 83 days.

This patent is subject to a terminal disclaimer.

(21) Appl. No.: 16/607,536

(22) PCT Filed: Apr. 30, 2018

(86) PCT No.: PCT/US2018/030309
§ 371 (c)(1),
(2) Date: Oct. 23, 2019

(87) PCT Pub. No.: WO2019/212521
PCT Pub. Date: Nov. 7, 2019

(65) Prior Publication Data
US 2021/0331408 A1 Oct. 28, 2021

(51) Int. Cl.
*B33Y 50/02* (2015.01)
*B29C 64/393* (2017.01)
(Continued)

(52) U.S. Cl.
CPC .......... *B29C 64/393* (2017.08); *B29C 64/165* (2017.08); *B29C 64/205* (2017.08);
(Continued)

(58) Field of Classification Search
None
See application file for complete search history.

(56) References Cited

U.S. PATENT DOCUMENTS

| 6,723,402 B2 | 4/2004 | Nair et al. |
| 71,291,662 | 10/2006 | Speakman |

(Continued)

FOREIGN PATENT DOCUMENTS

| WO | WO-2016186613 A1 * | 11/2016 | ........... B29C 64/165 |
| WO | WO2017162306 A1 | 9/2017 | |

(Continued)

*Primary Examiner* — Jason Lin
(74) *Attorney, Agent, or Firm* — HP Inc. Patent Department

(57) ABSTRACT

Some examples include an additive manufacturing build object including an electrical component and a build object body. The electrical component having a varying electrical resistivity within a resistivity range of 109 ohms per square to 105 ohms per square, the resistivity range obtained by an application and fusing of a fusing component of a printing agent and build material, the printing agent applied to the build material at a predetermined saturation dosage range corresponding to the resistivity range. The build object body having a second electrical resistivity obtained by an application and fusing of the fusing component of the printing agent and the build material, the printing agent applied at a dosage below the predetermined saturation dosage range, the build object body being electrically non-conductive.

10 Claims, 3 Drawing Sheets

(51) Int. Cl.
*B33Y 80/00* (2015.01)
*B29C 64/165* (2017.01)
*B29C 64/205* (2017.01)
*B33Y 10/00* (2015.01)
*B33Y 30/00* (2015.01)
*B29L 31/34* (2006.01)

(52) U.S. Cl.
CPC ............... *B33Y 50/02* (2014.12); *B33Y 80/00* (2014.12); *B29L 2031/3425* (2013.01); *B33Y 10/00* (2014.12); *B33Y 30/00* (2014.12); *G05B 2219/49023* (2013.01)

(56) References Cited

U.S. PATENT DOCUMENTS

| | | | | |
|---|---|---|---|---|
| 8,021,778 | B2 * | 9/2011 | Snyder | H01M 50/133 |
| | | | | 429/162 |
| 8,260,203 | B2 * | 9/2012 | Brantner | H01Q 1/44 |
| | | | | 235/487 |
| 10,779,451 | B2 * | 9/2020 | Knox | H05K 3/3485 |
| 11,191,167 | B2 * | 11/2021 | Yudovin-Farber | H05K 3/125 |
| 11,239,422 | B2 * | 2/2022 | McAlpine | H01L 51/502 |
| 2007/0238056 | A1 * | 10/2007 | Baumann | B33Y 10/00 |
| | | | | 430/325 |
| 2015/0144380 | A1 | 5/2015 | Yang et al. | |
| 2015/0352785 | A1 | 12/2015 | Folgar et al. | |
| 2015/0366073 | A1 * | 12/2015 | Magdassi | B29C 64/112 |
| | | | | 264/494 |

FOREIGN PATENT DOCUMENTS

| | | | | |
|---|---|---|---|---|
| WO | WO-2017180161 | A1 * | 10/2017 | ........... B29C 64/112 |
| WO | WO2017180169 | | 10/2017 | |
| WO | WO2018022034 | A1 | 2/2018 | |

* cited by examiner

ADDITIVE MANUFACTURED RESISTIVITY

BACKGROUND

Additive manufacturing machines produce three dimensional (3D) objects by building up layers of material. Some 3D printing techniques are considered additive processes because they involve the application of successive layers of material. Some additive manufacturing machines are commonly referred to as "3D printers". 3D printers and other additive manufacturing machines make it possible to convert a CAD (computer aided design) model or other digital representation of an object into the physical object. The model data may be processed into slices, each defining that part of a layer or layers of build material to be formed into the object.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Various 3D printing technologies can differ in the way layers are deposited and fused, or otherwise solidified, to create a build object, as well as in the materials that are employed in each process. The descriptions and examples provided herein can be applied to various additive manufacturing technologies, environments, and materials to form a 3D object based on data of a 3D object model.

The present disclosure provides systems and methods for printing three dimensional (3D) objects with electrically conductive features or components. Aspects of the present disclosure include an additive manufacturing system and method for printing 3D objects including electrical circuitry or other electrically conductive components as part of a build object using a single printing agent for electrically conductive components (e.g., electrical circuitry) and electrically non-conductive components of the build object. Electrically conductive features can be employed to manage electrostatic discharge of the 3D build object and/or employed as electrical circuitry components. Printed 3D objects in accordance with aspects of the present disclosure can include surfaces forming electrostatic discharge (ESD) coatings and/or electrical conductive components including capacitors, resistors, inductors, conductive traces, vias, and more complex geometric electronic components.

Figure 1:
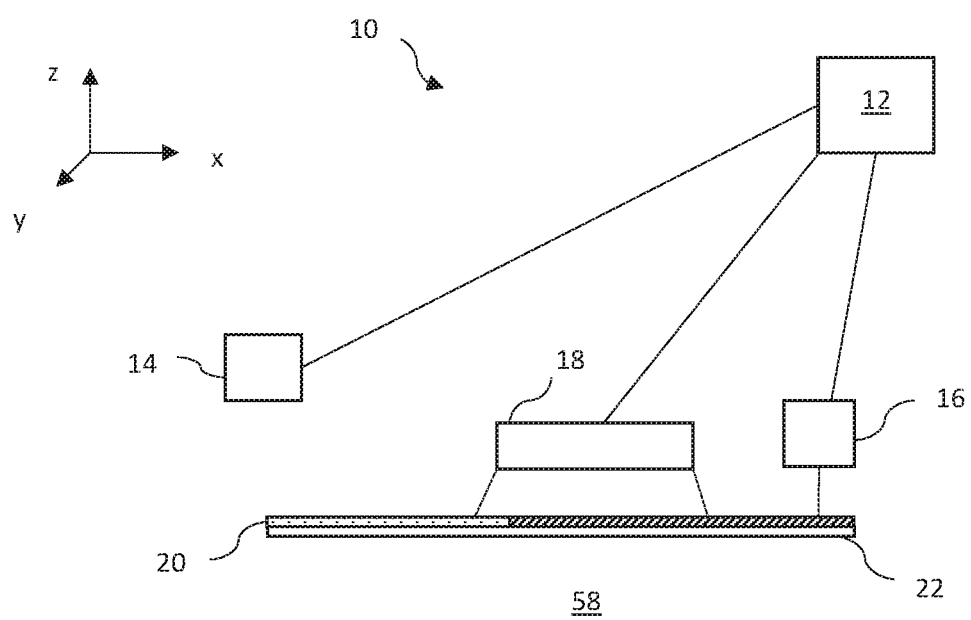
FIG. 1 is a schematic diagram of an example additive manufacturing system in accordance with aspects of the present disclosure.

FIG. 1 is a schematic diagram of an example additive manufacturing system 10 in accordance with aspects of the present disclosure. Additive manufacturing system 10 includes a controller 12, a build material supply device 14, a printhead 16, and an energy source 18. Controller 12 controls build material supply device 14, printhead 16, and energy source 18 to form a 3D build object. Controller 12 can manipulate and transform data, which may be represented as physical (electronic) quantities, in order to control build material supply device 14, printhead 16, and energy source 18 employed to create the 3D build object, as described further below.

Controller 12 can be a computing device, a semiconductor-based microprocessor, a central processing unit (CPU), an application specific integrated circuit (ASIC), and/or another hardware device. Controller 12 can be in communication with a data store (not shown) that can include data pertaining to a 3D build object to be formed by the additive manufacturing system 10. Controller 12 can receive data defining an object to be printed including, for example, 3D object model data and resistivity or conductivity data. In one example, the 3D object model data includes data related to the build object size, shape, position, orientation, color, etc. In one example, a 3D object model and/or other received data can include data that defines electrical circuit components or other portions as the build object as being electrically conductive. The data can be received from Computer Aided Design (CAD) systems or other electronic systems useful in the creation of a three-dimensional build object. Controller 12 can manipulate and transform the received data to generate print data. Controller 12 employs print data derived from the 3D build object model data and resistivity or conductivity data of the 3D build object to be formed in order to control elements of the additive manufacturing machine to selectively deliver/apply build material, printing agent, and energy.

In this respect, controller 12 controls build material supply device 14 to deposit build material onto a build surface 22 to form a build material layer 20. Build surface 22 can be a surface of a platen or underlying build layers of build material on a platen within a build chamber, for example. Build material supply device 14 supplies and deposits successive layers of build material to form a build volume within a build area. Build material supply device 14 can be moved across build surface 22 within the build area on a carriage, for example.

The build material can be a powder polymer-based type of build material. The build material can include polymer, ceramic, metal, or composite powders (and powder-like materials), for example. Polymeric build material can be crystalline or semi-crystalline polymers in powder form. In some examples the powder may be formed from, or may include, short fibres that may, for example, have been cut into short lengths from long strands or threads of material. According to one example, a suitable build material may be PA12 build material commercially known as V1R10A "HP PA12" available from HP Inc.

Printhead 16 is adapted to deposit liquid agents, such as a printing agent, onto the build material layer based on generated print data. Controller 12 controls printhead 16 to selectively deposit printing agent based on the print data. Controller 12 can transform received data of the build object to generate print data including various saturation levels of the printing agent dispensed from printhead 16 to achieve the desired resistivity levels of the build object. Printhead 16 can include a single inkjet pen, for example, or multiple inkjet pens. Desired surface resistivity levels can be accomplished with dual pass, single pass, or multiple passes of printhead 16. In some examples, multiple pens in one pass can be faster than multiple passes with fewer pens. In one example, printhead 16 includes at least one fusing agent pen and at least one detailing agent pen. In some examples, the same printhead can be employed to deposit both printing agent and detailing agent. In other examples, separate printheads are used for each of printing agent and detailing agent. Controller 12 can control printhead 16 to simultaneously, non-simultaneously, or partially simultaneously apply printing agent and detailing agent onto build material layer 20 in one or more passes over build surface 22. Printhead 16 can be carried on a moving carriage system to move across the build area.

The printing agent can be an energy absorbing liquid that can be applied to build material, for example. According to one example, a suitable printing, or fusing, agent may be an ink-type formulation comprising carbon black, such as, for example, the fusing agent formulation commercially known as V1Q60Q "HP fusing agent" available from HP Inc. The printing agent can be electrically conductive at certain concentrations, dosages, or saturation levels (e.g., contone levels) and non-conductive at concentrations, dosages, or saturation levels (e.g., contone levels) lower than useful to provide conductivity due to the carbon black or other suitable agent included in the printing agent. Conductivity can be inversely related to surface resistivity. In other words, an agent with high resistivity has low conductivity and vice-versa. The surface resistivity can be rated in ranges of ohms per square (ohms/sq). In accordance with aspects of the present disclosure, an electrical component can have a resistivity between $10^9$ ohms/sq to $10^5$ ohms/sq and a body of the build object (e.g., electrically non-conductive component) can have a resistivity greater than $10^9$ ohms/sq as discussed further below.

Use of printing, or fusing, agents in varying saturation levels, or contone levels, can provide a three-dimensional build object to have varied material properties. The varying amounts of printing agent dispensed at an area can be referred to as a saturation level, or contone level, which can be determined based on desired final properties, including conductive properties, of the build object and can be varied throughout the build object based on the desired final properties of the build object. Several different contone levels can be employed throughout the build object, both within a respective layer and across a section of several layers, depending on the desired final properties of the build object.

The printing agent can be overprinted to increase the saturation level of the printing agent in a select area, and correspondingly, increase the conductivity where overprinted. Overprinting includes printing or otherwise depositing the printing agent onto the build material layer in an amount, or dosage, greater than otherwise used for fusing purposes. Higher dosages, and thus higher saturation levels, can provide better conductivity due to a larger amount of conductive material being deposited on the build material. The saturation level, or contone level, of the printing agent application forming the conductive element can be determined based on the received resistivity data and transformed into print data including contone level. The saturation level of the printing agent forming the conductive element can be varied across the select area in order that the conductive element have varying resistivity. In some examples, the saturation level of the printing agent forming the conductive element includes at least two saturation levels at or above a predetermined level for electrical conductivity.

In some examples, the concentration of the fusing component can be adjusted so that the fusing components are present in higher or lower amounts in the printing agent. The concentration can be adjusted based on a specific application. The concentration of the fusing component in the printing agent can be the same throughout the build process for both the electrically conductive and the electrically non-conductive components of the build object.

When the printing agent is dispensed (e.g., printed) onto the layer of build powder, the printing agent can penetrate into the spaces between the build powder particles. Microfluidic delivery of printing agent can be employed to selectively control the application of printing agent at certain dosages, layer by layer, to form a conductive components of the build object. When a low surface resistivity, or higher conductivity, is desired, a higher dosage of printing agent is used/dispensed. In accordance with aspects of the present disclosure, controller 12 can digitally control conductivity of the build object at the voxel level. Determining an amount of printing agent to be printed for each voxel can achieve various contone levels and can provide a simulation of a continuous tone. In order to achieve a maximum contone level (i.e., continuous tone), the inkjet pens can, for example, dispense the printing agent at the maximum firing frequency of the inkjet pens.

Controller 12 can use the print data to control printhead 16 to selectively apply the printing agent in dosages corresponding to various contone or saturation levels at various areas across the build material layer, for example. Select areas of increased contone, or saturation, levels of printing agent forming the electrically conductive components is tunable, or adjustable, dependent on the desired conductivity or resistivity attributes of the build object. The contone levels can be defined in a print mode using the generated print data. For example, controller 12 can be used to control printhead 16 for selective application of the printing agent in one or several passes over build surface 22.

Controller 12 controls energy source 18 to apply fusing energy to build material and printing agent on the build surface 22 in order to form the object layer. Build material and printing agent can be exposed to energy source 18, such as a thermal energy source, for fusing. Energy source 18 can include a heating source to heat build material layer and a fusing source to fuse the printing agent with the build material in locations that the printing agent is selectively applied. The printing agent can facilitate fusing of the build material, where printed or applied, by absorbing energy from the fusing energy source and converting the energy to heat to raise the temperature of the build material above the melting or softening point. Energy source 18 can generate heat that is absorbed by fusing energy absorbing components of the printing agent to sinter, melt, fuse, or otherwise coalesce the patterned build material. In some examples, the energy source can apply a heating energy, to heat the build material to a pre-fusing temperature, and a fusing energy, to fuse the build material where the printing agent has been applied. Thermal, infrared, or ultraviolet energy can be used, for example, to heat and fuse the material. Energy source 18 can be mounted to the carriage system and moved across the build surface to apply the heating and fusing energies to the patterned build material.

Figure 2:
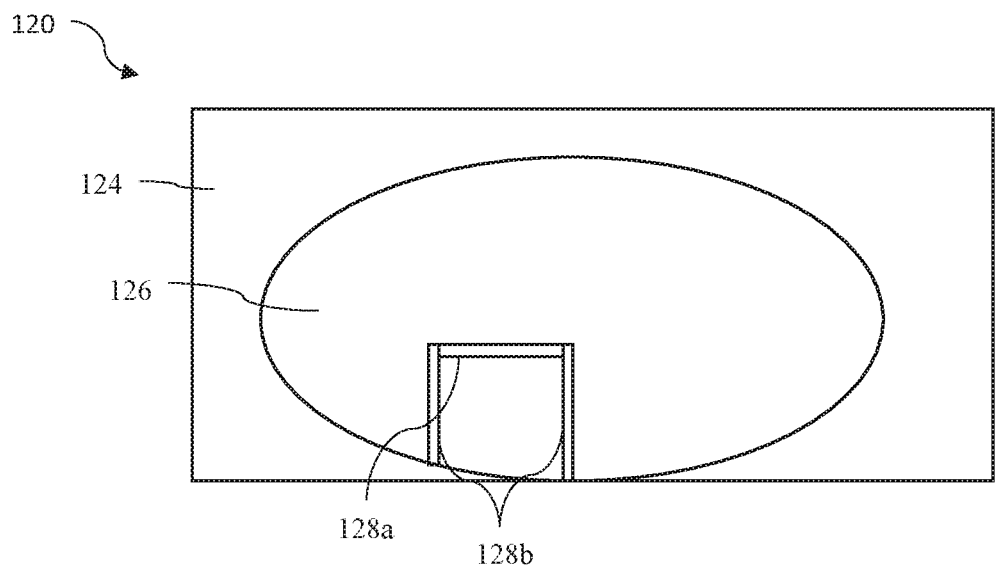
FIG. 2 is a schematic diagram of an example build object layer of a three dimensional build object undergoing additive manufacture in accordance with aspects of the present disclosure.

FIG. 2 is a schematic diagram of an example build object layer 120 undergoing additive manufacture in accordance with aspects of the present disclosure. Build object layer 120 includes a layer 124 of build material. The printing agent can be applied in a pattern on layer 124. The printing agent can be deposited at less than the predetermined dosage in the pattern of build object layer 120 to form the non-conductive build pattern portion 126 of the object layer. The printing agent can be deposited at or above the predetermined dosage in a select area of the pattern, or outside of the pattern, to form the electrically conductive component 128 of build object layer 120. The printing agent can be deposited at a varying level at or above the predetermined dosage to form the electrically conductive component 128 to include at least two electrically conductive resistivity levels. A higher level, or dosage, of the printing agent can be applied to provide conductive properties, for example. The increased application, or dosage, of printing agent at the select area builds the level of carbon black, or other effective conductive agent to provide conductivity increased into an electrically conductive range. The electrical component 128 formed at the select area can have a resistivity between $10^9$ ohms/sq to $10^5$ ohms/sq, for example. In some examples, electrical component 128 can have a varied resistivity within a resistivity range of $10^9$ ohms/sq to $10^5$ ohms/sq. In some examples, electrically conductive component 128 circuitry 128a, 128b having at least two different resistivity levels.

Received build object data can be transformed to determine an amount of print agent that corresponds to the desired electronic property, adjusting the processing conditions (e.g., how much of printing agent to apply) to achieve the desired resistivity in the regions) of the 3D build object that is/are to exhibit the desired electronic property, determining the amount of printing agent that corresponds to achieve the desired resistivity for the desired regions(s) that is/are not to exhibit the desired electronic property. Machine readable instruction (stored on a non-transitory computer readable medium) can be employed to cause controller 12 to control the amount of printing agent and detailing agent that is dispensed by printhead 16. Print data can include the locations on each layer 124 of build material that the print agent is to be deposited and the quantity of print agent to be dispensed at each location or area.

In some examples, print data is generated such that the first and/or the second portion of printing agent is distributed in the select area in a varying contone level pattern. At predetermined contone level, the fused print agent and build material become electrically conductive. Controller 12 controls at least one printhead 16 at apply printing agent onto the build material layer 124 based on the generated print data including a defined print data to print a first portion of printing agent onto build material layer 124 in a pattern of object layer 120 of the build object. First portion is deposited at a first contone level based on the defined print data. The first contone level of the first portion is less than a predetermined level for electrical conductivity. Print data is defined to print a second portion of printing agent onto build material layer in a select pattern of an electrical circuitry component 128 of the build object. Printing agent at the select pattern is deposited at a second contone level, with the second contone level being at or above the predetermined level for electrical conductivity. Controller 12 controls printhead 16 to dispense a first portion of printing agent based on the generated print data to apply printing agent onto the layer of print material in a pattern at a first contone level and in a second portion of printing agent in a select pattern at a second contone level. The build object includes an electrical component formed at the select area having a conductivity greater than the area of the build object body.

In one example, the select pattern is defined to overlap the pattern so that the second portion of the printing agent can be delivered at the pattern to increase, or build, the conductivity in the selective area to form the conductive electrical component 128 having a first conductivity higher than the second conductivity of the build object body 126. In another example, the select pattern that the second portion is selectively applied to an area that is outside of the pattern and the second portion is deposited to saturate the build material in the select pattern to a greater saturation level than the build material in the pattern area forming the non-conductive area. Additional portions of the printing agent can be applied at the selective area or as otherwise desired to selectively saturate the build material and increase conductivity. By increasing the dosage of the printing agent at the electrically conductive components 128 to effectively hyper-concentrate, or hyper-saturate, in comparison to the non-conductive components provides the intrinsic conductivity of the printing agent to provide a conductive component 128 that has desired conductivity and/or resistivity that is within a range of accepted or desired values.

When the printing agent is printed in a select area of the build material, the thermal energy source can heat the printed portion to a temperature at or above the melting or softening point, while the unprinted portions of the build material (e.g., polymer powder) remain below the melting or softening point. The patterned build material can solidify and form an object layer, or a cross-section, of a desired build object. The process is repeated layer by layer to complete the 3D build object. In some examples, sintering, or full thermal fusing, can be employed to melt and fuse small grains of build material particles (e.g., powders) together to form a solid object. Fusing can occur between layers as well as within layers such that a region of a lower layer that fusing agent is applied fuses with adjacent regions of the layer above that fusing agent was applied.

Figure 3:
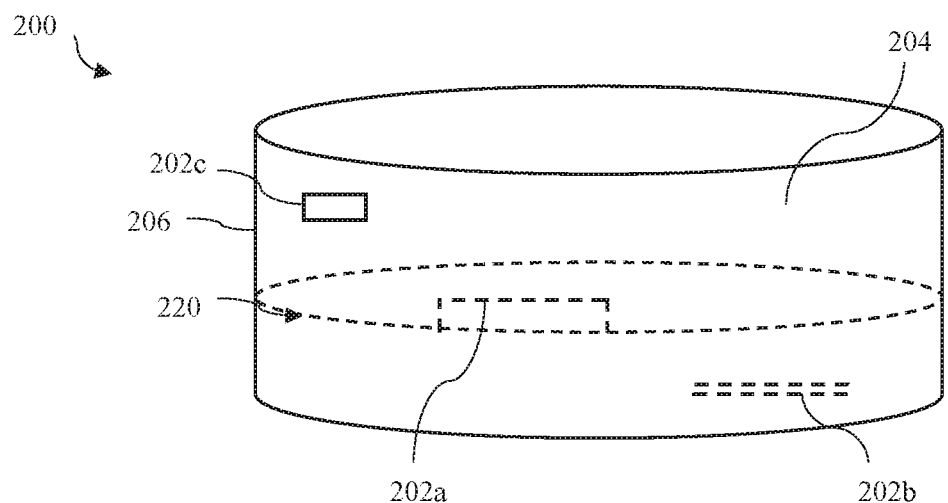
FIG. 3 is a schematic perspective view of an example three dimensional build object in accordance with aspects of the present disclosure.
Figure 4:
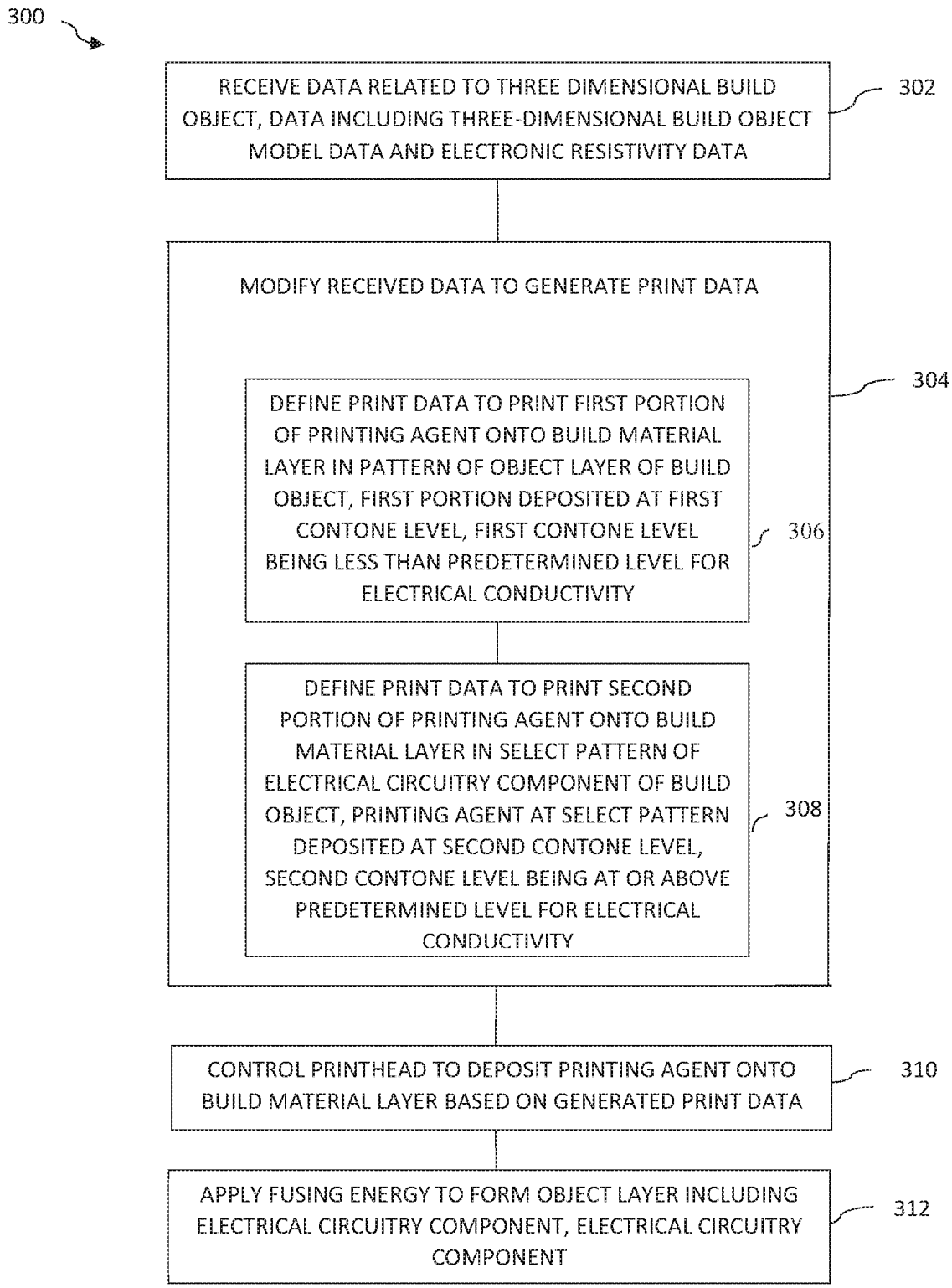
FIG. 4 is a flow chart of an example additive manufacturing method in accordance with aspects of the present disclosure.

FIG. 3 is a schematic perspective view of an example 3D build object 200 in accordance with aspects of the present disclosure. Build object 200 is formed during an additive manufacturing process in accordance with aspects of the present disclosure. Example build object 200 includes electrical components embedded within a build object body 204 (e.g., components 202a and 202b) and on a surface 206 of build object body 204 (e.g., component 202c) for illustrative purposes. In one example, at least one of electrical components 202 can be formed as conductive ESD capable traces. As discussed above, build object 200 is manufactured in layers. Layer 120 of FIG. 2 is represented by corresponding layer 220 in build object. Although FIG. 3 shows one layer 220 for clarity, build object 200 comprises multiple layers which are similarly produced.

Build object 200 can be any simple or complex shape that can be manufactured in an additive manufacturing machine. The shape of the build object 200 illustrated in FIG. 3 is for schematic illustrative purposes only and is not to be taken in a limiting sense. In accordance with aspects of the present disclosure, electrical components 202 of build object 200 can be formed as an enhanced conductive component on surface 206 of build object 200 or can be electrical circuitry formed internally or embedded within the build object 200. In accordance with aspects of the present disclosure, electrical circuitry components 202 of a build object can be formed in situ with the entirety of the build object 200, within the additive manufacturing machine, after being printed onto the build material and fused into a solid state.

During printing, heating, thermally fusing and/or curing, the printing agent can form a conductive matrix that becomes interlocked with the fused build material where the dosage dispensed is appropriate to provide the desired conductivity feature. The printed build layers (e.g., build layer 220) can be cured by exposing the printed build layer to fusing energy. The conductive printing agent becomes fused, or interlocked, with the fused build material particles to form a conductive matrix. The electrically conductive components 202 are formed where the printing agent is applied at a dosage level greater than applied to the build material for fusing the build material together to form build object body 204 of build object 200. In some examples, build object body 204 can be substantially non-conductive, having a surface resistivity of greater than $10^9$ ohms/sq.

In some examples, electrical components 202 provides an enhanced conductivity over build object body 204. In one example, the enhanced conductivity of the electrical component 202 can be ESD capable. Electrical circuitry or other electrically conductive components 202 as part of a build object 200 can be formed using a single printing agent for electrically conductive components 202 (e.g., electrical circuitry) and electrically non-conductive components including build object body 204 of build object 200. Electrical components 202 can be formed with increased dosages or concentrations of printing agent in selective areas of build object 200 to increase the conductivity of electrical component 202 over the conductivity of build object body 204. Electrical components 202 can be formed as electrical circuitry to provide an electrically conductive pathway within and/or on build object 200. Electrically conductive components 202 can be employed to manage electrostatic discharge of 3D build object 200 and/or employed as electrical circuitry components such as capacitors, resistors, inductors, conductive traces, vias, and more complex geometric electronic components. Electrical circuitry component 202 can have one or more resistivity levels across the component 202. In one example build object, electrical circuitry component can be formed as a strain gauge embedded within the build object.

At the end of production, any non-fused build material may be separated from fused build material forming the completed build object. Post-processing can include removal of material by one or more of blasting with sand or other blast material, and/or by application of compressed air, for example.

FIG. 5 is a flow chart of an example method 300. At 302, data related to a three dimensional build object is received, the data including three-dimensional build object model data and electronic resistivity data. At 304, the received data is modified to generate print data. At 306, print data is defined to print a first portion of a printing agent onto a build material layer in a pattern of an object layer of the build object. The first portion is deposited at a first saturation level, the first saturation level being less than a predetermined level for electrical conductivity. At 308, print data is defined to print a second portion of the printing agent onto the build material layer in a select pattern of an electrical circuitry component of the build object. The printing agent at the select pattern is deposited at a second saturation level, the second saturation level being at or above the predetermined level for electrical conductivity. At 310, a printhead is controlled to dispense the printing agent onto the build material layer based on the generated print data. At 312, fusing energy is applied to form the object layer including the electrical circuitry component, the electrical circuitry component having a resistivity between $10^9$ ohms per square to $10^5$ ohms per square. In some examples, 302-312 can be performed in a different order to that shown and/or performed at least partially simultaneously.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An additive manufacturing method comprising:
receiving data related to a three dimensional build object, the data including three-dimensional build object model data and electronic resistivity data;
modifying the received data to generate print data, comprising:
defining print data to print a first portion of a printing agent onto a build material layer in a pattern of an object layer of the build object, the first portion deposited at a first saturation level, the first saturation level being less than a predetermined level for electrical conductivity; and
defining print data to print a second portion of the printing agent onto the build material layer in a select pattern of an electrical circuitry component of the build object, the printing agent at the select pattern deposited at a second saturation level, the second saturation level being at or above the predetermined level for electrical conductivity;
controlling a printhead to dispense the printing agent onto the build material layer based on the generated print data; and
applying fusing energy to form the object layer including the electrical circuitry component, the electrical circuitry component having a resistivity between $10^9$ ohms per square to $10^5$ ohms per square.

2. The method of claim 1, wherein defining the print data to cause the printhead to print the second portion of the printing agent at the second saturation level includes varying the second saturation level within a range at or above the predetermined level for electrical conductivity to form the electrical circuitry component including at least two resistivity levels, each of the at least two resistivity levels being between $10^9$ ohms per square to $10^5$ ohms per square.

3. The method of claim 1, wherein controlling the printhead to dispense the printing agent includes depositing the first portion and the second portion in a plurality of passes of a printing agent applicator.

4. The method of claim 1, wherein defining the print data to print the second portion of the printing agent includes defining the second portion of the printing agent to form a first resistivity at a first area of the select pattern and a second resistivity at a second area of the select pattern, the first resistivity greater than the second resistivity.

5. The method of claim 1, wherein controlling the printhead to dispense the printing agent includes depositing the first portion and the second portion from the same printhead.

6. An additive manufacturing system comprising:
a controller, the controller being configured to:
generate print data from received data related to a three-dimensional build object, the received data including three-dimensional object model data and electronic resistivity data, the generated print data comprising:

defined print data to print a first portion of a printing agent onto a build material layer in a pattern of an object layer of the build object, the printing agent being electrically conductive at a predetermined saturation level, the first portion defined at a first saturation level below the predetermined saturation level;

defined print data to print a second portion of the printing agent onto the build material layer in a select area, the second portion defined at a second saturation level being at least at the predetermined saturation level; and control a build material supply device to deposit build material onto a build surface to form the build material layer;

control a printhead to deposit the printing agent onto the build material layer based on the generated print data; and control an energy source to apply fusing energy to form the object layer, the object layer of the build object including electrical component formed at the select area, the electrical component having a resistivity based on the defined print data, the electrical component having a varying resistivity between $10^9$ ohms per square to $10^5$ ohms per square.

7. The additive manufacturing system of claim 6, wherein the pattern is formed around the select area.

8. The additive manufacturing system of claim 6, wherein the controller is to control the printhead to deposit the second portion of the printing agent onto the build material layer at select areas of the pattern of the object layer.

9. The additive manufacturing system of claim 6, wherein the controller is to generate print data including defined print data to print the first portion at the first saturation level to form a build object body having conductivity in a resistivity range of greater than $10^9$ ohms per square.

10. The additive manufacturing system of claim 6, wherein the pattern and the select pattern area are the same.

* * * * *